Feb. 27, 1940. R. URTEL 2,191,634
RECTIFIER
Filed Oct. 27, 1936

INVENTOR
RUDOLF URTEL
BY H.S.Grover
ATTORNEY

Patented Feb. 27, 1940

2,191,634

UNITED STATES PATENT OFFICE 2,191,634

RECTIFIER

Rudolf Urtel, Berlin, Germany, assignor to Telefunken Gesellschaft für Drahtlose Telegraphie m. b. H., Berlin, Germany, a corporation of Germany Application October 27, 1936, Serial No. 107,817
In Germany November 26, 1935

5 Claims. (Cl. 175—363)

The invention concerns a circuit arrangement for the rectification of preferably high frequency alternating currents and in particular for the case where the rectifying action is to be at times influenced or interrupted. Problems of this nature arise particularly in the transmission of stationary or moving images.

For the purpose of accomplishing a rectification of this type, a multi-grid tube is to work in accordance with the invention on the steep branch of the current take-up characteristic and one or several grids are to be impressed with potentials for the control or interruption of the rectifying action.

Figure 1:
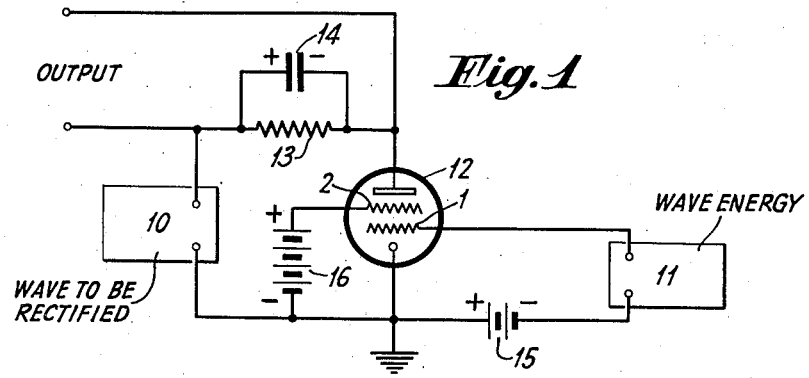
Figure 2:
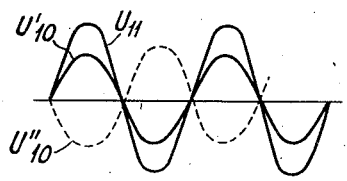
Figure 3:
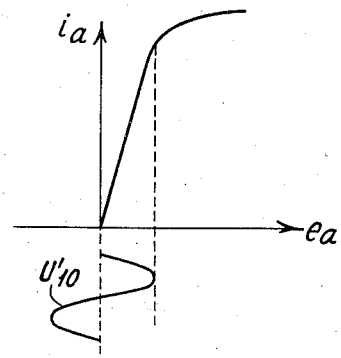
Figure 4:
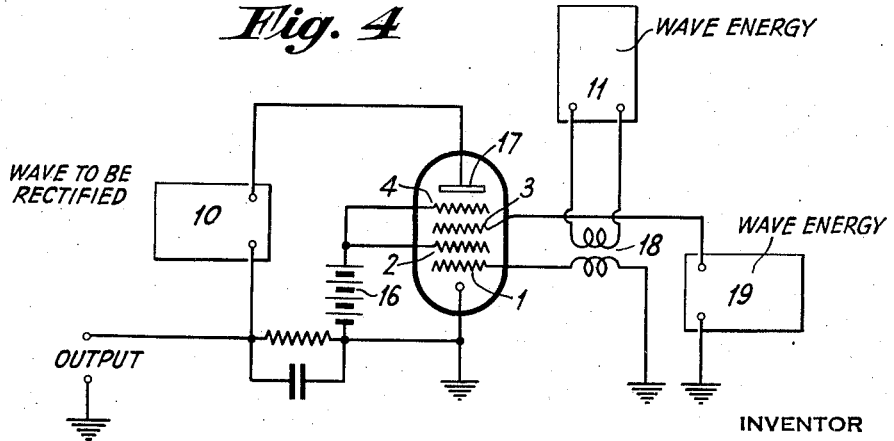

An embodiment of the invention, whereby an alternating potential is to be rectified only in case it is in phase with a given alternating potential of equal frequency, no rectification to take place however, when the two alternating potentials are in phase opposition, is shown in diagrammatic manner in Figure 1. Figures 2 and 3 are curves illustrating the principle of operation of my rectifier and Figure 4 is a modification of the arrangement of Figure 1. In Figure 4 rectification is controlled by additional control potentials.

In the arrangement according to Figure 1 an alternating potential of varying size is impressed on terminals 10 of such a nature that it may change at times its phase position with respect to an alternating potential at terminals 11 of equal frequency and constant amplitude. The problem may now be given to rectify the alternating potential at terminals 10 only in case that it is cophasal to that appearing at terminals 11, but that no rectification is to take place if the potential at terminals 10 is in phase opposition to that at terminals 11. For this purpose terminals 10 are connected in the plate circuit of a screen grid tube 12 which plate circuit contains besides a resistance 13 and a condenser 14 connected in parallel thereto. To the control grid circuit of the screen grid tube is added potential 11, if necessary in series with a grid biasing potential source 15. The screen grid potential is furnished by a constant potential source 16 which is preferably dimensioned in such manner that tube 12 works on the steep portion of its characteristic even, throughout maximum amplitude swings of alternating potential 10.

The mode of operation of this arrangement is best explained with the aid of Figure 2, wherein $U_{11}$ represents the course of the constant alternating potential in the control grid circuit and $U'_{10}$ the course of the alternating potential in the plate circuit at the phase position with respect to potential $U_{11}$ where a rectification is to take place. During the positive halfwaves of potential $U'_{10}$, a positive potential $U_{11}$ appears also at the screen grid so that a plate current may flow producing at condenser 14 a potential with a polarity as shown. If potential at terminal 10 reverses however, its phase position, that is, takes a course according to curve $U''_{10}$, the control grid of the tube during the time that a positive potential appears at its plate, is strongly negative since in that case potential $U_{11}$ has the same sign as the negative grid biasing potential source 15. Hence, no rectification occurs with this phase position of the potential at terminals 10.

The arrangement according to Figure 1 is notable for the fact that the rectification of the potential appearing at terminals 10 is obtained with a very small inner resistance of tube 12 as long as said potential is in phase with the potential at terminals 11.

In order to accomplish the rectification satisfactorily, the screen grid of the tube is impressed with a constant potential of such nature that even the maximum amplitudes appearing at terminals 10 cannot go beyond the steep branch of plate current $i_a$ of the tube 12, as illustrated in Figure 3. When the phase position of the potential at terminals 10 is varied continuously with respect to terminals 11, the potential at condenser 14 decreases continuously.

In the exemplified embodiment according to Figure 4, the stipulation set previously in connection with Figure 1 that rectification is to occur only with phase coincidence with a given fixed alternating potential is to be supplemented with a further stipulation that rectification is to take place only at certain definite times. The terminals whereat appears the alternating potential to be rectified are connected in the plate circuit of a hexode 17 containing besides, as in Figure 1, resistance 13 and condenser 14. The secondary of a transformer 18 is connected in the circuit of control grid 1 of tube 17, the primary being led to terminals 11. Grid 3 which should be biased normally in such manner that the flow of current through tube 17 is blocked, is supplied at terminals 19 with a positive potential during the time the rectification is to take place.

The arrangement according to Figure 4 operates with respect to rectification as a function of the mutual phase position of potentials $U'_{10}$ and $U_{11}$ similarly as described for Figures 2 and 3. However, even with phase coincidence of $U_{10}$ and $U_{11}$, a plate current can only appear if at terminals 19 there exists a potential of the nature that the flow of current through the tube is not blocked. Hence, a control is established in such manner that the rectifying action may be influenced or interrupted by means of corresponding potentials at grid 3.

A suitable dimensioning of potential source 16, whereto are connected grids 2 and 4, also provides that even with the largest amplitude of potential $U_{10}$ operations still occur on the steep branch of characteristics according to Figure 3 and that thus the rectification is accomplished through a very small internal resistance which may be also rendered variable by a continuous change in the phase relations between $U_{10}$ and $U_{11}$.

I claim:

1. A rectifying circuit for an alternating current system comprising a multi-grid electron discharge tube, a source of waves to be rectified connected between the cathode and anode of said tube, means including a second source of wave energy applied between the cathode and one of the grids of said tube for blocking the same when the two sources are in phase opposition and means including one of the other grids for maintaining linearity of rectification.

2. A device in accordance with claim 1 and having a third source of wave energy applied between the cathode and an appropriate one of the grids of said tube for controlling the same.

3. In a system for rectifying an alternating current from a first source by means of a multi-grid electron discharge tube wherein is provided a cathode, the method of controlling, and at times interrupting the rectifying action which comprises impressing an alternating potential from a second source between the cathode and one grid of said tube, impressing an alternating potential from a third source between the cathode and a second grid of said tube, and restricting the rectifying action when it occurs to be linear with respect to the difference of the impressed potentials.

4. A rectifier comprising an electron discharge tube having an anode, a cathode and a plurality of grids, a source of energy to be rectified, a parallelly connected resistor and condenser connected in series with said source, said series connection of the parallelly connected resistance and condenser and said source being connected between the anode and the cathode of said tube, a source of reference energy for controlling the time periods of rectification connected between one of the plurality of grids, and bias means connected between one of the other of the plurality of grids and the cathode for providing linear rectification.

5. A rectifier as claimed in claim 4 and comprising in addition, a second source of reference voltage connected between another one of said plurality of grids and the cathode for restricting rectification to time periods during phase coincidence of the reference energies.

RUDOLF URTEL.